July 18, 1967
C. A. BERQUIST ET AL
3,331,286
TOOL FOR REMOVING INSIDE FLASH FROM WELDED PIPE
Filed Oct. 20, 1965
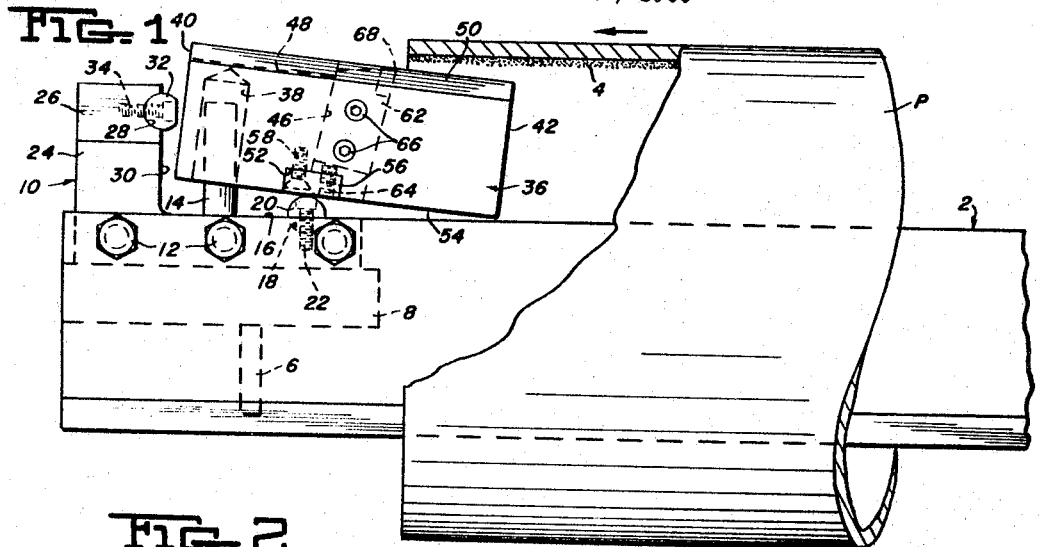
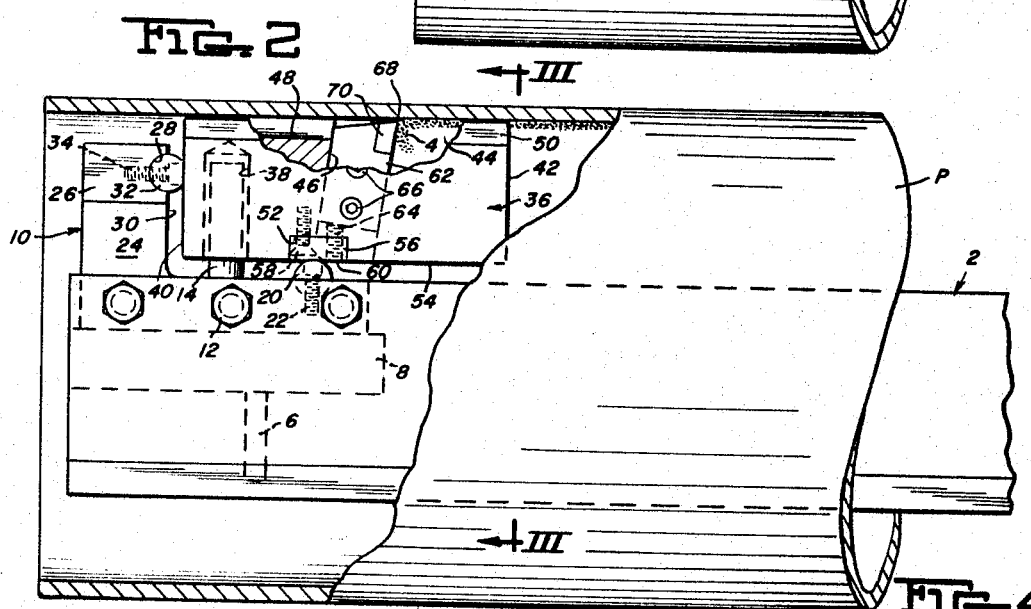
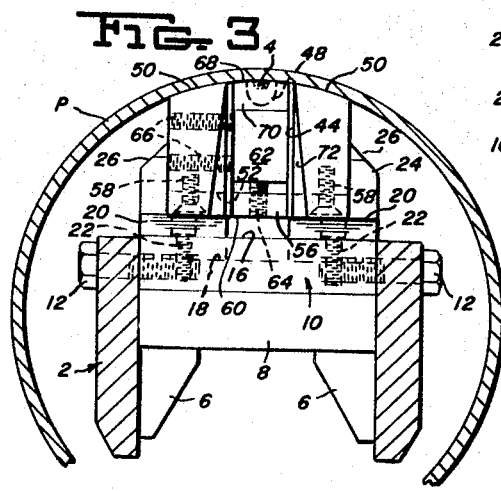
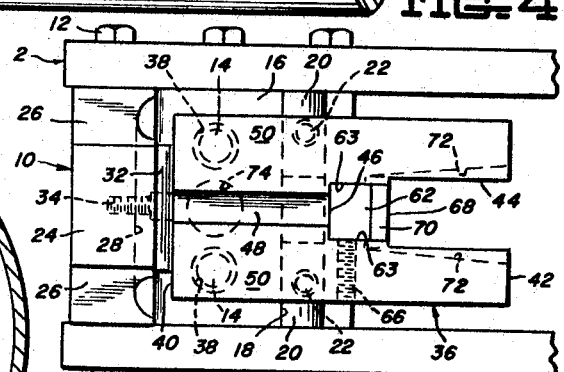
INVENTORS
CHARLES A. BERQUIST and
HARRY H. TEAL
By Donald G. Dalton
Attorney 3,331,286
TOOL FOR REMOVING INSIDE FLASH FROM
WELDED PIPE
Charles A. Berquist, Pittsburgh, and Harry H. Teal, Versailles Borough, McKeesport, Pa., assignors to United States Steel Corporation, a corporation of Delaware
Filed Oct. 20, 1965, Ser. No. 498,916
6 Claims. (Cl. 90—24)

This invention relates to apparatus for trimming the inside flash or burr from longitudinally welded metal pipe or tubing during the manufacture thereof.

In the manufacture of electric-resistance welded steel pipe, for example, after the skelp or strip has been shaped into preliminary tubularform having an open seam cleft, the spaced longitudinal edges thereof are heated to a fusion temperature and forced together by pressure rolls to produce a continuous integral weld of the seam. As the abutting edges are forced together, hot metal is extruded both outwardly and inwardly of the pipe to form a continuous flash or burr along the weld. The height, thickness and conformation of this flash vary according to pipe size, strip thickness and welding conditions.

The removal of the flash from the outside surface of the pipe is relatively simple and may be done by any one of several conventional methods. Trimming the flash formed on the inner surface of the pipe is more difficult, however, in the high-speed continuous production of welded pipe where it is highly desirable to trim the flash in the production line. Various complicated devices have been designated for the purpose. Our tool design is a relatively simple one capable of precise inside flash trimming.

It is, accordingly, an object of our invention to provide an inside flash trimmer which is fully floating and self aligning during operation so that it removes inside flash to a uniform predetermined thickness.

A further object of our invention is to provide an inside flash trimmer which may be readily adapted for processing pipe of various sizes.

These and other objects will become more apparent after referring to the following specification and attached drawings, in which:

FIGURE 1 is a side elevational view of the trimming tool in inoperative position;

FIGURE 2 is a side elevational view, partly in section, of the trimming tool in operative position;

FIGURE 3 is a section taken along line III—III of FIGURE 2; and

FIGURE 4 is a plan view of the trimming tool.

Referring more particularly to the drawings, reference numeral 2 indicates generally the body of a mandrel over which a pipe P travels longitudinally as it is welded. The welded pipe has a longitudinal flash bead 4 on the inner surface thereof. Mandrel 2, mounting the trimming tool, is held longitudinally stationary and is fastened to and extends from a unit of the pipe producing line (not shown). At the outer extremity of mandrel 2, gussets 6 and a plate 8 thereon support an L-shaped bracket 10 fastened to mandrel 2 by means of bolts 12. Two transversely spaced pins 14 are mounted in an upstanding position and adjacent the inner end of the longitudinal upper face 16 of bracket 10. In a transverse arcuate groove 18 adjacent the outer end of face 16, spaced pivot bearings 20 project from the groove in bracket 10 and are fastened thereto by cap screws 22. Bracket 10 has an upstanding end 24 with bevelled side portions 26 thereon. In a transverse arcuate groove 28 in the inner face 30 of end 24, a bearing pad 32 projects from this groove in bracket 10 and is fastened thereto by a cap screw 34.

A tool-holder bar 36 has two transversely spaced cylindrical recesses 38 drilled upwardly in the bottom and adjacent one end 40 thereof, adapted to fit over pins 14. The diameter of recesses 38 is somewhat larger than the outside diameter of pins 14 to allow bar 36 to fit loosely over the pins as shown in FIGURE 1. As shown in FIGURE 2, end 40 of bar 36 is adapted to be engaged by bearing pad 32. Spaced from recesses 38 in a direction opposite the travel of pipe P to the opposite end 42 of bar 36 there is provided a longitudinally elongated slot 44 having an oblique inner end face 46.

In the top face of bar 36, a longitudinal groove 48 extends from end 40 to end face 46. Groove 48 and slot 44 divide the top face of bar 36 into two longitudinal portions 50 that straddle flash bead 4 and are machined to engage the upper inner surface of pipe P adjacent flash 4, as best shown in FIGURE 3. A generally rectangular, transverse recess 52 in bottom face 54 of bar 36 intersects slot 44. A bearing plate 56 in recess 52 is fastened to bar 36 by countersunk screws 58. The outer face 60 of plate 56 is substantially flush with bottom face 54 of bar 36, and as shown in FIGURES 1 and 2 is adapted to be supported by pivot bearings 20.

A flash-removing tool 62 is adjustably positioned in slot 44 against end face 46 and between the spaced parallel sides 63 thereof. A set screw 64 passing through bearing plate 56 provides vertical adjustment for tool 62, which is fastened to bar 36 by a pair of set screws 66. The cutting edge 68 of cutting tool 62 is formed on a cemented carbide tip 70 carried in the upper portion of the forward face of the cutting tool. Between spaced parallel sides 63 and end 42, the sides 72 of slot 44 are flared downwardly, to provide uninterrupted passage therebetween for a continuous length of trimmed flash 4. To assure proper weight distribution in bar 36, and support thereof on pivot bearings 20, an upwardly extending cylindrical recess 74 may be drilled in bottom face 54 between spaced recesses 38, as shown in FIGURE 4.

In operation, as shown in FIGURE 1, the recesses 38 of tool holder bar 36 are fitted over pins 14. The bar rests on pivot bearing 20. Hence, bar 36 may be easily lifted from or dropped into its inoperative position. Prior to being placed in this inoperative position, the cutting edge 68 of cutting tool 62 is adjusted to trim or cut the desired amount of flash 4 from pipe P. In the operative position, as shown in FIGURE 2, pipe P is passed continuously over the trimmer assembly. As the pipe travels thereover, the cutting edge 68 cuts into the flash bead 4 causing a continuous length of material to be removed therefrom which is guided between the downwardly flaring sides 72 of slot 44 and the forward face of cutting tool 62.

The trimming of flash 4 thus effected is precise because of the fully floating and self-aligning characteristic of tool holder bar 36. As best shown in FIGURE 2, bar 36 is fully floating since it is supported between three spaced contact areas. Firstly, it is supported from above against the inside surface of the pipe by the longitudinal portions 50 that straddle the flash 4. It is supported from below by bearing plate 56 on spaced pivot bearings 20. Its end face 40 is supported against bearing pad 32 projecting from the upstanding end 24 of bracket 10. In this aligned flash-trimming position, spaced upstanding pins 14 are out of contact with their respective recesses 38.

The device of our invention may be readily adapted to process increasingly larger diameter pipe by substituting bracket 10 and/or bar 36. It is obvious that mandrel 2 may be shaped similarly to bracket 10 to accommodate pins 14, pivot bearings 20 and bearing pad 32 in support of bar 36. For easy size and wear substitution, however, it is preferred to use a bracket 10. Where only rough trimming of a flash bead is required, our invention may be practiced with a single rather than two upstanding pins 14 and a pivot bearing 20 to support bar 36 having flash removing tool 62 mounted thereon. Our invention furthermore may be used to cut hot or cold flash bead from a longitudinally moving pipe.

Although we have disclosed herein the practice of our invention, we intend to cover as well any change or modification therein which may be made without departing from the spirit and scope of the invention.

We claim:

1. An inside flash trimmer for welded pipe comprising a mandrel over which the pipe travels longitudinally as it is welded, a pin upstanding on said mandrel, a tool-holder bar having a recess adjacent one end adapted to fit over said pin, a slot spaced in a direction opposite pipe travel from said recess, a flash-removing tool secured in said slot and a pivot bearing on said mandrel supporting said bar from below.

2. An inside flash trimmer as defined in claim 1 having an abutment upstanding on said mandrel spaced in the direction of pipe travel from said pin adapted to be engaged by said one end of said bar.

3. An inside flash trimmer as defined in claim 1 having longitudinal portions on said bar adapted to be engaged by upper, inner portions of said pipe adjacent said flash.

4. An inside flash trimmer as defined in claim 1 having two transversely spaced pins upstanding on said mandrel, said bar having spaced recesses adapted to fit over said pins.

5. An inside flash trimmer as defined in claim 1 wherein said bar has a second recess spaced in a direction opposite pipe travel from the first recess, a bearing plate mounted in said second recess adapted to engage said pivot bearing.

6. An inside flash trimmer for welded pipe comprising a mandrel over which the pipe travels longitudinally as it is welded, a bracket mounted on said mandrel, two transversely spaced pins upstanding on said bracket, a tool-holder bar having spaced recesses adjacent one end adapted to fit over said pins, spaced longitudinal portions on said bar adapted to be engaged by upper, inner portions of said pipe adjacent said flash, a slot in said bar spaced in a direction opposite pipe travel from said recesses, a flash-removing tool secured in said slot, a pivot bearing on said bracket supporting said bar from below, an upstanding portion on said bracket spaced in the direction of pipe travel from said pins and a bearing pad on said upstanding bracket portion adapted to be engaged by said one end of said bar.

No references cited.

WILLIAM W. DYER, Jr., *Primary Examiner.*

G. A. DOST, *Assistant Examiner.*